United States Patent
Chang

(10) Patent No.: US 6,836,610 B2
(45) Date of Patent: Dec. 28, 2004

(54) ELECTRICAL VARIABLE OPTICAL ATTENUATOR

(75) Inventor: Yao-Hao Chang, Chung-Ho (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 358 days.

(21) Appl. No.: 10/017,225

(22) Filed: Oct. 22, 2001

(65) Prior Publication Data

US 2003/0049011 A1 Mar. 13, 2003

(30) Foreign Application Priority Data

Sep. 7, 2001 (TW) ........................................ 90215376 U

(51) Int. Cl.[7] ................................................. G02B 6/00
(52) U.S. Cl. ........................ 385/140; 385/47; 359/287; 359/888
(58) Field of Search ........................ 385/140, 47, 25, 385/31, 18; 359/287, 888, 889, 577, 579

(56) References Cited

U.S. PATENT DOCUMENTS

| | | | | |
|---|---|---|---|---|
| 5,745,634 A | * | 4/1998 | Garrett et al. ............... | 385/140 |
| 6,130,984 A | * | 10/2000 | Shen et al. ................... | 385/140 |
| 6,144,794 A | * | 11/2000 | Mao et al. .................... | 385/140 |
| 6,163,643 A | * | 12/2000 | Bergmann et al. ........... | 385/140 |
| 6,285,504 B1 | * | 9/2001 | Diemeer ....................... | 359/578 |
| 6,483,982 B1 | * | 11/2002 | Takahashi .................... | 385/140 |
| 6,553,175 B2 | * | 4/2003 | Jaspan .......................... | 385/140 |

* cited by examiner

*Primary Examiner*—Frank G. Font
*Assistant Examiner*—K. Cyrus Kianni
(74) *Attorney, Agent, or Firm*—Wei Te Chung

(57) ABSTRACT

An electrical variable optical attenuator (10) of the present invention has a housing (1), a cover (2), an attenuating means (3), an optical module (4), an electrical driving element (5), an input fiber (87) and an output fiber (86). The attenuating means includes a carrier (30) having a guide groove (301) and an inner screw (302). A filter (32) is fixed on the carrier. The optical module includes a guide pole (41). The electrical driving element has a screw rod (552), which couples with the inner screw. The attenuating means is assembled inside the optical module with the guide pole being received in the guide groove to confine the direction of movement of the carrier along the screw rod, thus helping to avoid trembling of the filter when the screw rod is rotated.

14 Claims, 7 Drawing Sheets

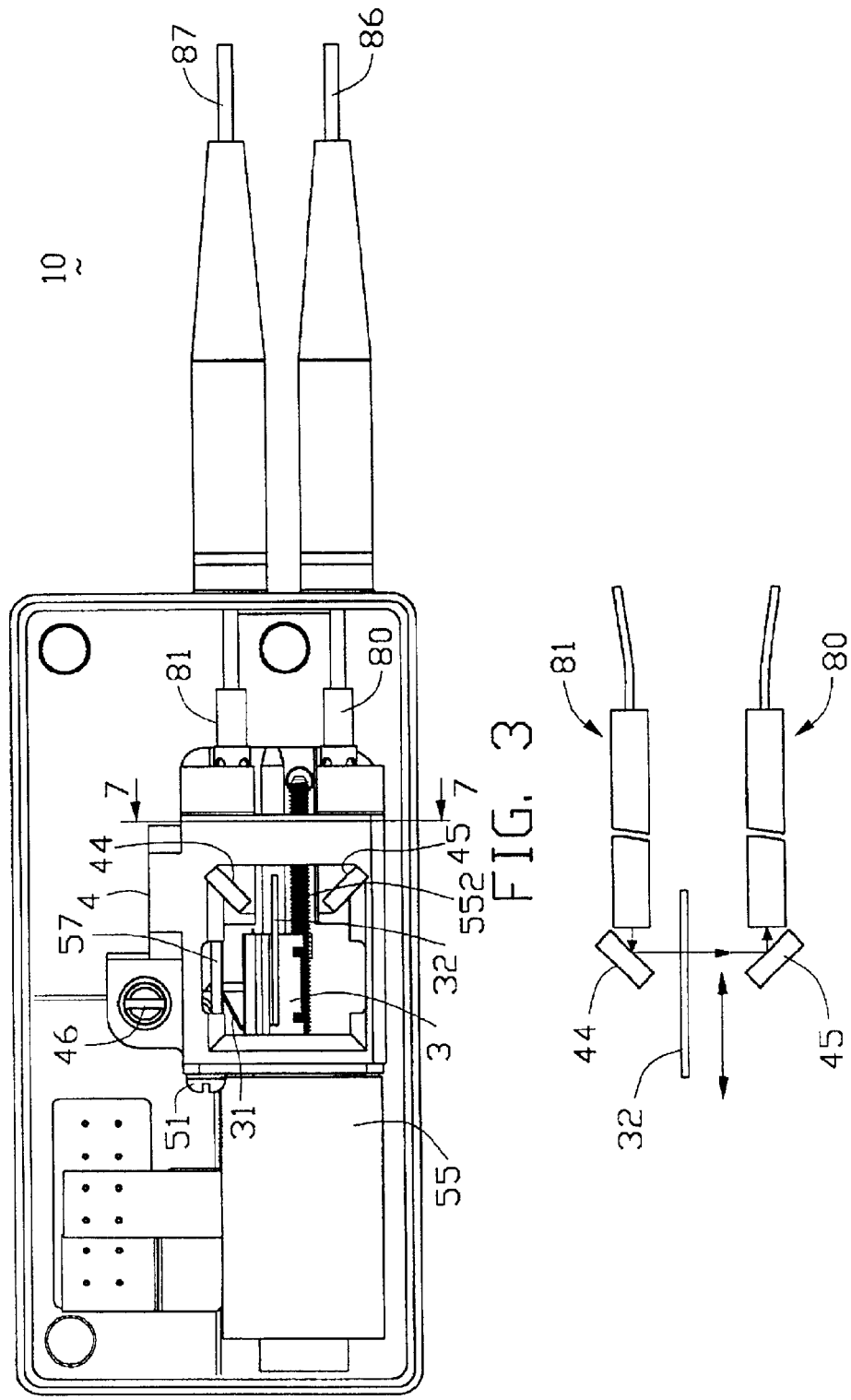

ELECTRICAL VARIABLE OPTICAL ATTENUATOR

BACKGROUND OF THE INVENTION

1. Field of the Invention

The present invention relates to an electrical variable optical attenuator for use in optical fiber communications and for use with optical network technology, and particularly to an electrical variable attenuator with a mechanism for holding the orientation of an attenuation filter without inducing trembling of the filter.

2. Description of Related Art

An optical attenuator is a passive optical component for reducing optical power propagating in an optical fiber, and may perform fixed or variable attenuation. Optical attenuators are widely used in optical mission systems and optical networks.

A general variable attenuator has a filter. The filter has an effective filter region disposed in the optical path between a collimator and a reflector. The filter has a filter density which varies from a low density region to a high density region. The transmitted light is attenuated to different intensities by linear movement of the filter across the optical path of the light.

For example, U.S. Pat. No. 6,130,984 discloses an electrical variable optical attenuator comprising a filter mounted on a wiper for being selectively positioned within the optical path of a light beam, a screw for guiding and coupling with the wiper, and a motor for driving the screw to rotate. The wiper and the screw keep relatively stable along the intended axial center line of the screw. Changing the axial center line of the screw, however, causes the axial center line of the wiper and the filter to change with respect to the optical path of the light. When the motor drives the screw to rotate, the screw and the filter tremble slightly. This trembling affects the attenuated value and its precision.

The present invention provides an electrical variable optical attenuator which has a mechanism for precisely orientating the filter and avoiding trembling of the filter.

SUMMARY OF THE INVENTION

An object of the present invention is to provide an electrical variable optical attenuator, and particularly to provide an electrical variable attenuator having a mechanism for orientating the filter while avoiding trembling of the filter.

An electrical variable optical attenuator of the present invention comprises a cover, a housing, an optical module, an attenuating means, an electrical driving element, an input fiber and an output fiber.

The electrical driving element comprises a screw, a stepping motor, a pin holder and a resistor. The stepping motor drives a screw rod. The stepping motor controls the direction and speed of the screw rod according to the resistance provided by the resistor. The screw rod drives the attenuating means.

The attenuating means comprises a carrier, a filter and a sliding patch. The carrier has an insertion slot on top of the carrier for fixing the filter therein, a guide groove in a bottom of the carrier, and an inner screw and a slot separately defined in both sides of the carrier. The sliding patch is fixed in the slot and comprises a wiper portion for contacting with the resistor. The filter has a varying optical density gradient along at least one of its dimensions.

The optical module has a guide pole, a first mirror, a second mirror, a through hole, a pair of containing grooves, and a guide hole. The containing grooves separately fix fiber collimators attached to ends of the input and output fibers, holding them parallel to one another and directed towards the two mirrors. The through hole is defined in a sidewall of the optical module. The guide pole is received in the guide groove of the carrier for confining the movement of the carrier along the screw rod, thereby avoiding trembling of the screw rod during rotation of the screw rod.

In assembly, the resistor of the electrical driving element is received in a cavity of the optical module. The guide pole of the optical module is received in the guide groove of the carrier. The screw rod of the electrical driving element extends through the through hole and engages with the inner screw of the attenuating means. The wiper portion of the attenuating means contacts with the resistor of the electrical driving element. The optical module and the electrical driving element are fixed together and fixed into the housing.

Other objects, advantages, and novel features of the present invention will become more apparent from the following detailed description when taken in conjunction with the accompanying drawings.

BRIEF DESCRIPTION OF THE DRAWINGS

FIG. 3 is a partially assembled detail of FIG. 2, without a cover, from a top-aspect;

FIG. 4 is an essential optical path view of the electrical variable attenuator;

DETAILED DESCRIPTION OF THE INVENTION

Figure 1:
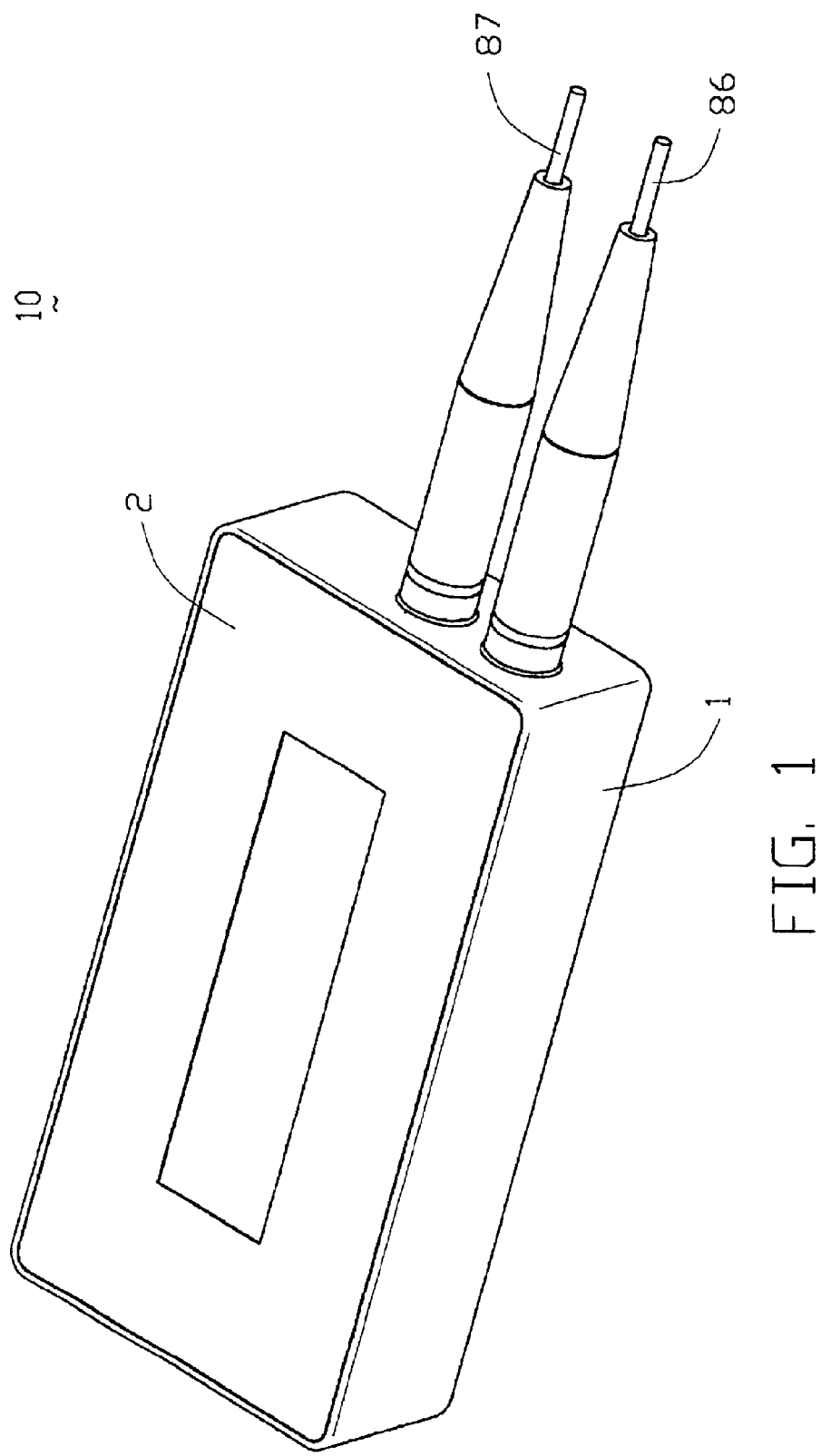
FIG. 1 is an assembled view of an electrical variable optical attenuator of the present invention.
Figure 2:
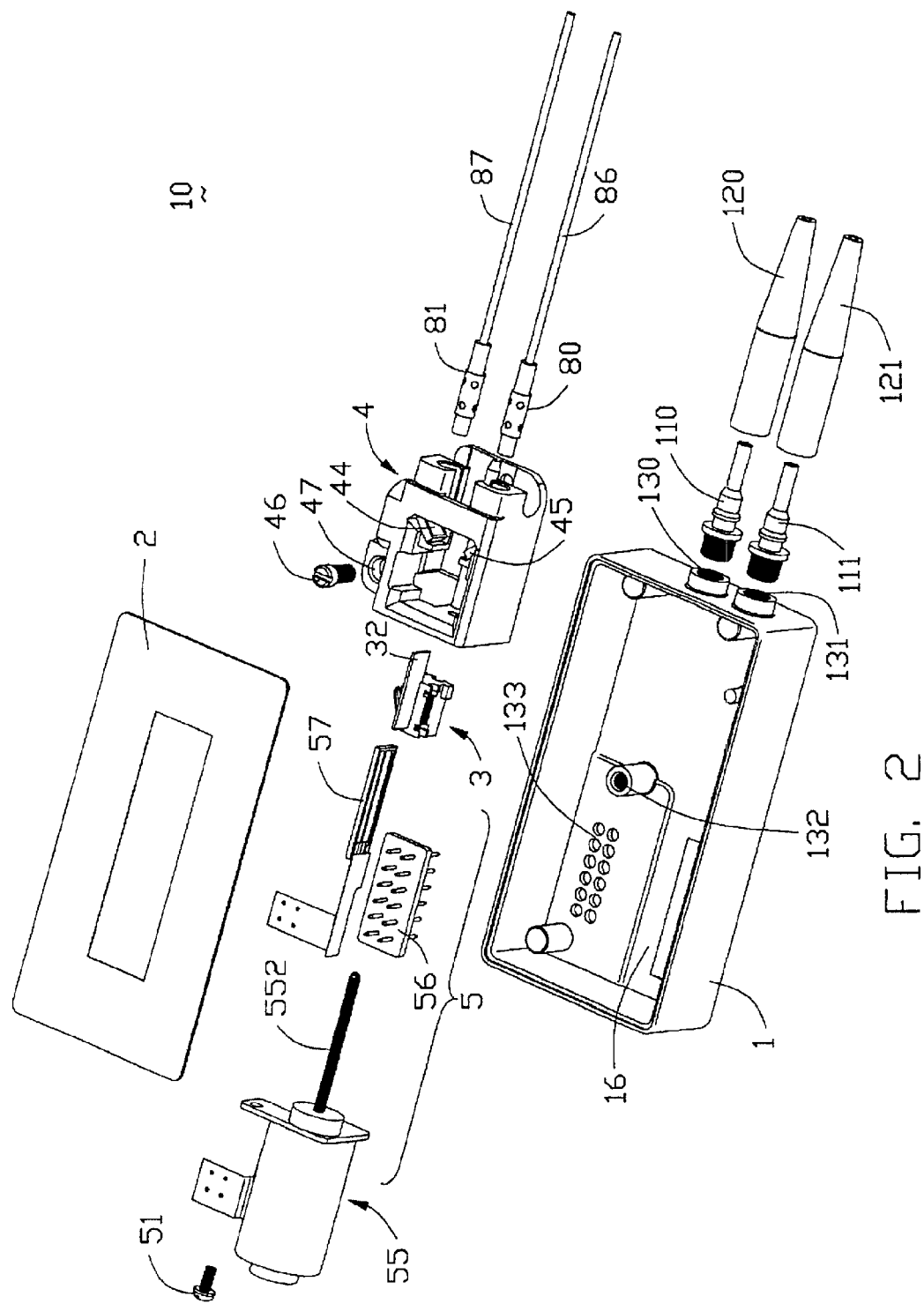
FIG. 2 is a perspective, exploded view of the electrical variable optical attenuator of FIG. 1.

As shown in FIG. 1 and FIG. 2, an electrical variable optical attenuator 10 of the present invention comprises a housing 1, a cover 2, an attenuating means 3, an optical module 4, an electrical driving element 5, an input fiber 87, output fiber 86, an input fiber collimator 81, an output fiber collimator 80, boots, 120, 121 and fiber housings 110, 111.

The housing 1 formed by four sidewalls (not labeled) and a bottom wall 16 defines an inner cavity (not labeled) therebetween. A screw hole 132 is defined in a sleeve (not labeled) protruding into the middle of the inner cavity (not labeled) of the housing 1. A plurality of pin holes 133 defined in a corner of the bottom wall 16 of the housing 1. Two side holes 130, 131 are defined in one sidewall (not labeled) of the housing 1.

The electrical driving element 5 comprises a screw 51, a stepping motor 55, a pin holder 56 and a resistor 57. The stepping motor 55 comprises a screw rod 552. The pin holder 56 is mounted in the pin holes 133 of the housing 1. An outside electrical source (not shown) supplies power to"

the stepping motor 55 and the resistor 57 through the pin holder 56. The stepping motor 55 is fixed in the inner cavity (not labeled) of the housing 1, and drives the attenuating means 3 to move. The resistance provided by the resistor 57 varies corresponding to the position of the attenuating means 3. The stepping motor 55 controls and drives the screw rod 552 to rotate according to the amount of resistance provided by the resistor 57, then drives the attenuating means 3 to move.

Figure 5:
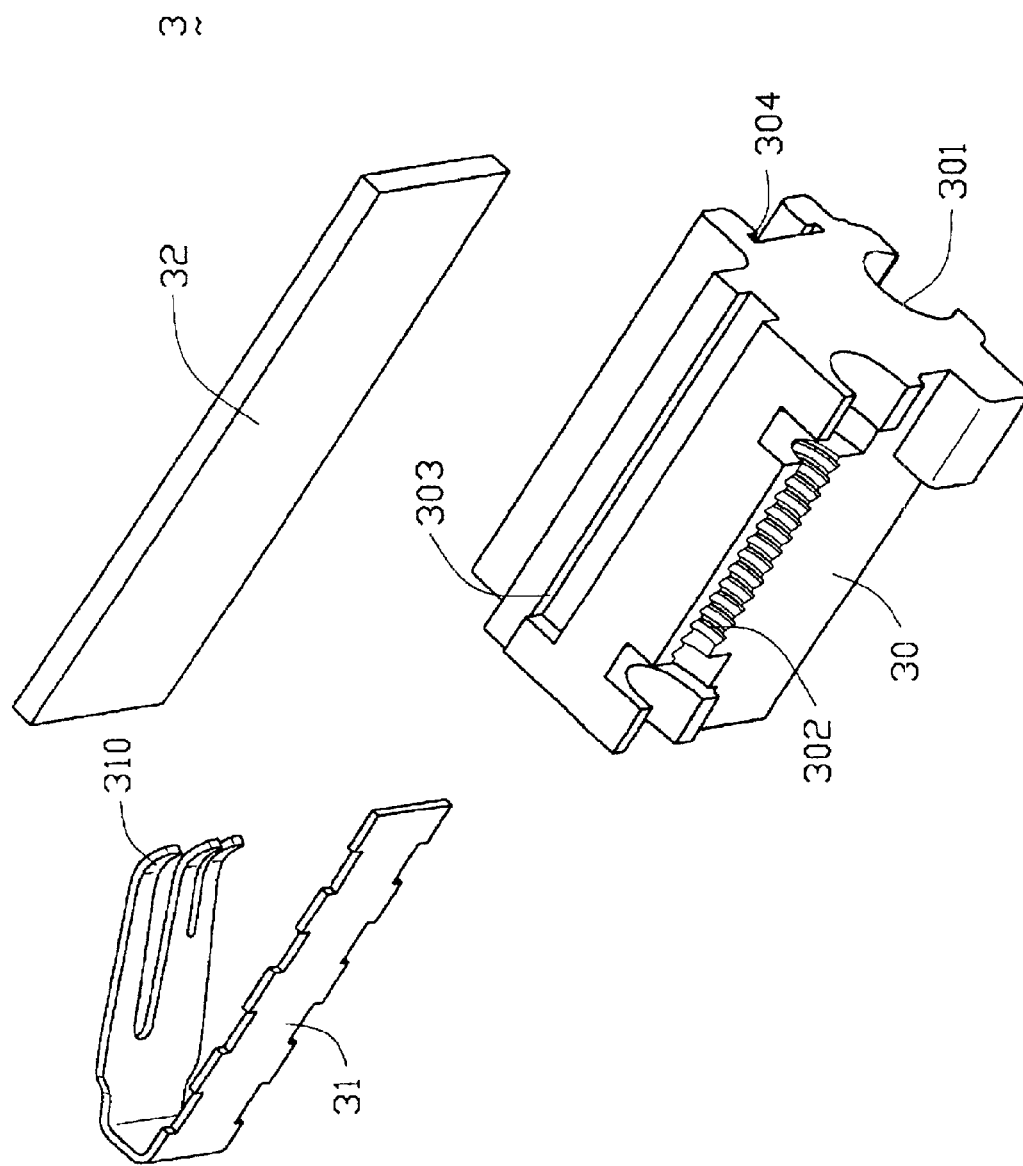
FIG. 5 is a perspective, exploded view of an attenuating means of the electrical variable optical attenuator.

Also referring to FIG. 5, the attenuating means 3 comprises carrier 30, a filter 32 and a sliding patch 31. The carrier 30 defines insertion slot 303 in a top thereof for fixing the filter 32 therein, and a guide groove 301 in a bottom Thereof. The carrier 30 also comprises an inner screw 302 and a slot 304 separately disposed in opposite sides thereof. The sliding patch 31 is fixed in the slot 304, and comprises a wiper portion 310 for contacting the resistor 57. The filter 32 has a varying optical density gradient along at least one of its dimensions.

Figure 6:
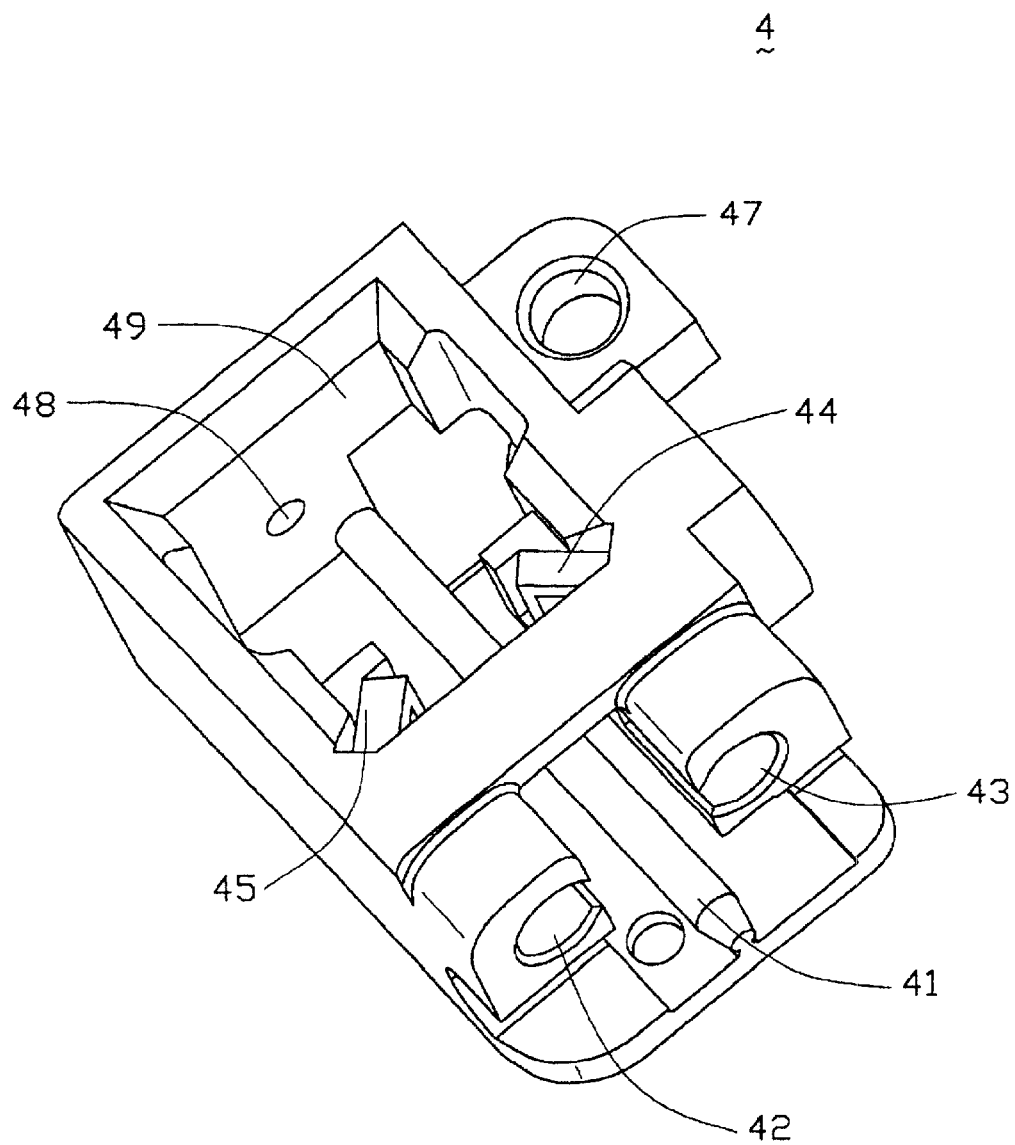
FIG. 6 is a perspective view of an optical module of the electrical variable optical attenuator.

Also referring to FIG. 6 the optical module 4 comprises a guide pole 41, a first mirror 44, and a second mirror 45, and defines a through hole 48, a pair of containing grooves 42, 43, and a guide hole 47. The containing grooves 42, 43 separately fix and hold the fiber collimators 80, 81 parallel to one another, each fiber collimator 80, 81 being separately directed toward a corresponding mirror 45, 44. The guide hole 47 is positioned in one side of the optical module 4. The guide hole 47 aligns with the screw hole 132 of the housing 1 and the screw 46 is inserted through the guide hole 47 and engaged in the screw hole 132, thereby mounting the optical module 4 in the housing 1. The through hole 48 is defined in a sidewall 49 of the optical module 4, opposite from where the fiber collimators 80, 81 are mounted. The screw rod 552 of the stepping motor 55 extend through the through hole 48 and into the cavity (not labeled) of the optical module 4. The guide pole 41 is received in the guide groove 301 of the carrier 30 for confining the movement of the carrier 30 along the screw rod 552, and thereby avoiding trembling of the carrier 30 when the screw rod 552 is rotated.

FIG. 4 shows the essential optical path of the electrical variable optical attenuator 10. Signals from the input fiber collimator 81 are reflected by the first mirror 44, pass through the filter 32, are attenuated by the filter 32, and are reflected by the second mirror 45 to pass through the output fiber collimator 80. The filter 32 moves along a direction perpendicular to the optical path between the first mirror 44 and the second mirror 45.

Figure 7:
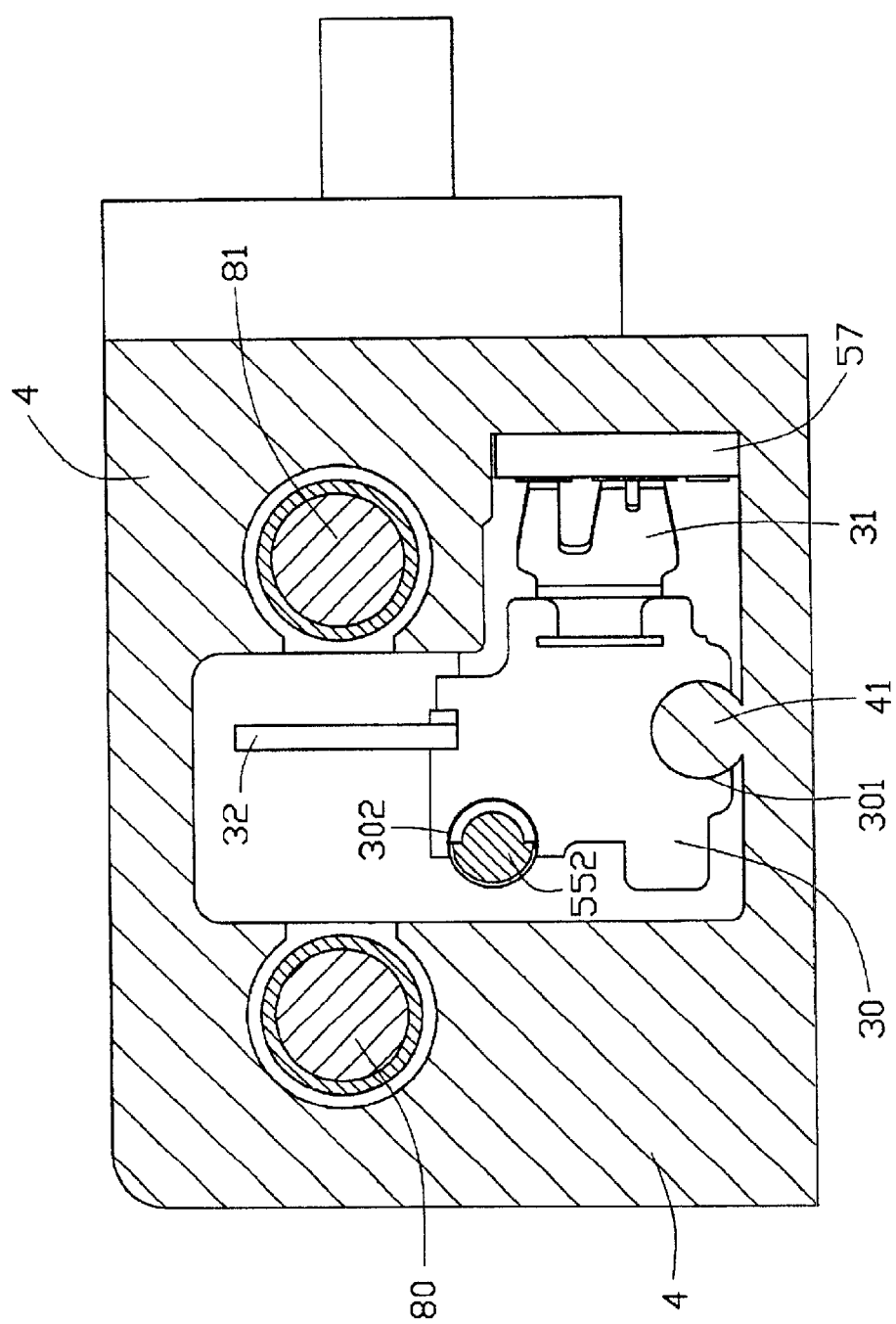
FIG. 7 is a cross-sectional view taken along line 7—7 of FIG. 3.
Figure 8:
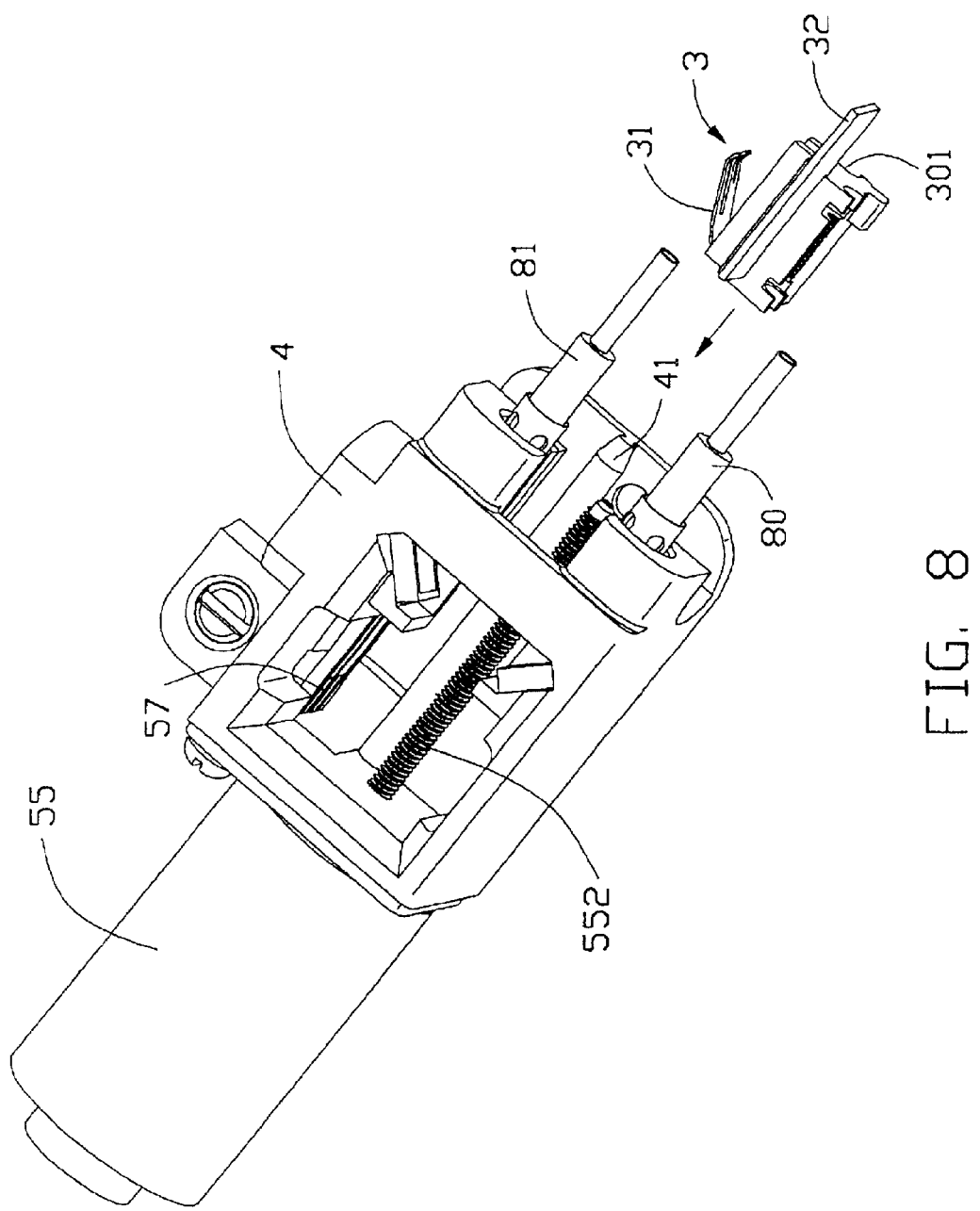
FIG. 8 is a perspective, partially assembled view of the electrical variable optical attenuator with the attenuating means outside the assembly.

As shown in FIG. 3, FIG. 7 and FIG. 8, in assembly, the sliding patch 31 is engaged in the slot 304 of the carrier 30. The filter 32 is inserted into the insertion slot 303 of the carrier 30. The attenuating means 3 is received in the optical module 4, with the guide pole 41 of the optical module 4 being received in the guide groove 301 of the carrier 30. The optical module 4 and the electrical driving element 5 are mounted in the inner cavity (not labeled) of the housing 1. The stepping motor 55 and the optical module 4 are fixed together by the screw 51. The pin holder 56 mourns in the pin holes 133 of the housing 1, and pin hole pads (not labeled) at the side of the stepping motor 55 and the resistor 57 engage with the pin holder 56. The resistor 57 of the electrical driving element 5 is received in the optical module 4, adjacent one inner sidewall of the optical module 4. The screw rod 552 of the electrical driving element 5 extends through the through hole 48 and engages with the inner screw 302 of the attenuating means 3. The wiper portion 310 of the attenuating means 3 contacts the resistor 57 of the electrical driving element 5. The input fiber 87 is inserted through the boot 120 and the fiber housing 110 and is attached to the input fiber collimator 81. The output fiber 86 is inserted through the boot 121 and the fiber housing 111 and is attached to the output fiber collimator 80. The fiber collimators 80, 81 are engaged in corresponding containing grooves 42, 43 of the optical module 4, and the fiber housings 110, 111 are engaged in the side holes 130, 131. The boots 120, 121 are pulled over the respective fiber housings 110, 111.

In use, the stepping motor 55 drives the screw rod 552 in a clockwise and counterclockwise direction, as controlled by the resistance provided by the resistor 57. The screw rod 552 in turn drives the carrier 30 forward and backward along the guide pole 41, and thus the filter 32 moves forward and backward as well. The optical density gradient of the filter 32 varies in a front to rear direction, so that as the filter 32 is carried forward and backward, a light beam from the mirror 44 to the mirror 45 is attenuated by a different amount, depending on the position of the carrier 30 and filter 32 in the optical module 4.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical variable optical attenuator for attenuating optical signals input from an input optical fiber and output to an output optical fiber comprising:

an attenuating means comprising:
      a moveable carrier defining a guide groove and a slot;
      a sliding patch fixed in the slot; and
      a filter fixed on the carrier, the filter having a varying optical density gradient along at least one of its dimensions;

an optical module having a guide pole which is received in the guide groove of the carrier; and an electrical driving element;

wherein the electrical driving element drives the attenuating means to move along a dimension over which the optical density gradient of the filter varies.

2. The electrical variable optical attenuator as claimed in claim 1, wherein the carrier further defines an insertion slot into which the filter is fixed.

3. The electrical variable optical attenuator as claimed in claim 2, wherein the sliding patch further comprises a wiper portion.

4. The electrical variable optical attenuator as claimed in claim 3, wherein the electrical driving element comprises a resistor contacting the wiper portion.

5. The electrical variable optical attenuator as claimed in claim 1, wherein the electrical driving element drives the carrier to move along the guide pole.

6. The electrical variable optical attenuator as claimed in claim 1, wherein the electrical driving element comprises a stepping motor, which drives the carrier to move along the guide pole.

7. The electrical variable optical attenuator claimed in claim 6, wherein the stepping motor has a screw rod, the carrier further defines an inner screw, and the screw rod engages with the inner screw to drive the carrier along the guide pole.

8. The electrical variable optical attenuator as claimed in claim 1, wherein the optical module further comprises at least one mirror.

9. The electrical variable optical attenuator claimed in claim 1, further comprising a housing, the electrical driving element and the optical module being mounted in the housing.

10. An electrical variable optical attenuator for attenuating optical signals input from an input optical fiber and output to an output optical fiber, comprising:

a guide pole;

a pair of mirrors for reflecting signals from the input optical fiber to the output optical fiber;

a carrier having a guide groove for receiving the guide pole;

a filter fixed on the carrier, the filter having a varying optical density gradient along at least one of its dimensions; and a stepping motor;

wherein said mirrors are positioned so that optical signals emitted from the input optical fiber reflect off one mirror, pass through the filter fixed on the carrier, then reflect off the second mirror and are received by the output optical fiber, and the stepping motor drives the carrier to move along the guide pole whereby the filter moves along a direction parallel to a dimension over which the optical density gradient of the filter varies.

11. The electrical variable optical attenuator as claimed in claim 10, wherein the carrier further defines an inner screw.

12. The electrical variable optical attenuator as claimed in claim 11, wherein the stepping motor has a screw rod and the screw rod engages with the inner screw, and when the stepping motor rotates the screw rod, the carrier is driven along a direction parallel to an axial direction of the screw rod.

13. The electrical variable optical attenuator as claimed in claim 10, wherein the carrier defines an insertion slot into which the filter is fixed.

14. The electrical variable optical attenuator as claimed in claim 10, further comprising a housing and a cover, wherein the other components of the electrical variable optical attenuator are contained within the housing.

* * * * *